(12) United States Patent
Douberly et al.

(10) Patent No.: US 10,313,179 B1
(45) Date of Patent: Jun. 4, 2019

(54) SYSTEMS AND METHODS FOR NETWORK ELEMENT ACCESS ANALYSIS, COLLISION AVOIDANCE, AND FAULT RESOLUTION

(71) Applicant: Sprint Communications Company L.P., Overland Park, KS (US)

(72) Inventors: David N. Douberly, Orlando, FL (US); Bryson Earl, Altamonte Springs, FL (US); Justin L. Ford, Orlando, FL (US); Jonathan E. Mejias, Orlando, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 163 days.

(21) Appl. No.: 15/498,410

(22) Filed: Apr. 26, 2017

(51) Int. Cl.
*H04L 12/24* (2006.01)
*H04L 29/08* (2006.01)

(52) U.S. Cl.
CPC ........ *H04L 41/0654* (2013.01); *H04L 41/046* (2013.01); *H04L 41/06* (2013.01); *H04L 41/12* (2013.01); *H04L 67/1097* (2013.01); *H04L 67/325* (2013.01)

(58) Field of Classification Search
CPC ............... H04L 41/0654; H04L 41/064; H04L 41/0672; H04L 41/08; H04L 41/0803; H04L 41/06; H04L 41/046; H04L 67/1097; H04L 41/12; H04L 67/325; H04W 74/04; H04W 74/0808; H04W 74/0816
See application file for complete search history.

(56) References Cited

U.S. PATENT DOCUMENTS

| | | | | |
|---|---|---|---|---|
| 5,568,605 A * | 10/1996 | Clouston | ............... | H04L 41/046 709/224 |
| 5,892,954 A * | 4/1999 | Tomas | ................ | G06F 16/1774 710/200 |
| 6,504,853 B1 * | 1/2003 | Lindgren | ............ | H04L 12/4035 370/458 |
| 7,546,354 B1 * | 6/2009 | Fan | ..................... | H04L 67/1097 709/219 |
| 2006/0064554 A1 * | 3/2006 | Fridella | ................. | G06F 3/0614 711/152 |
| 2010/0002664 A1 * | 1/2010 | Pan | ......................... | F03B 13/00 370/338 |
| 2011/0230181 A1 * | 9/2011 | Carmon | ................ | H04W 56/00 455/422.1 |
| 2012/0072577 A1 * | 3/2012 | Motoyama | ............ | H04L 41/022 709/224 |
| 2015/0351130 A1 * | 12/2015 | Kourzanov | ....... | H04W 74/0816 370/329 |
| 2016/0309512 A1 * | 10/2016 | Li | ..................... | H04W 74/0816 |
| 2017/0041951 A1 * | 2/2017 | Yin | ................... | H04W 74/0808 |
| 2018/0234313 A1 * | 8/2018 | Cohen | ................. | H04L 41/0672 |

* cited by examiner

*Primary Examiner* — Ramy M Osman

(57) ABSTRACT

Systems and methods discussed herein are associated with network data element maintenance, including determining access times for the collection of network element data, as well as delivering and analyzing real-time data to detect and avoid collisions between parties who desire to access network elements. The systems and methods used herein may also determine the most effective command to execute in response to different faults on network elements in order to automatically resolve faults in a more efficient manner.

18 Claims, 5 Drawing Sheets

SYSTEMS AND METHODS FOR NETWORK ELEMENT ACCESS ANALYSIS, COLLISION AVOIDANCE, AND FAULT RESOLUTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications service providers and equipment manufacturers may access information recorded by element management systems (EMS) associated with various network elements in order to review the performance of said elements. This review and analysis of data may interrupt or slow down services, at least in part because of multiple access attempts by the telecommunications service provider and/or equipment manufacturer or other parties. In addition, data collected from these elements by the element management systems may not be stored indefinitely, so there exists both urgency and timing components to both the data collection and analysis that is parallel to a desire to minimize service slowdown and interruption, at least as noticed by the end user.

SUMMARY

In an embodiment, a system for determining when to retrieve data across a plurality of network elements, comprising: a server comprising a non-transitory memory and an application configured to, when executed by a processor: retrieve data for a plurality of network elements across a telecommunications network, wherein the data comprises access instances, scheduled maintenance, access requests, faults, and fault resolutions, wherein the access and the access requests are each associated with a party. The data is stored on each network element expires after a predetermined time period; and the application is further configured to correlate, for each network element of the plurality of network elements, the access and the access requests to determine a plurality of access collisions. In an embodiment, the application is further configured to determine, for each network element, a time period for network element access based upon the plurality of access collisions; and schedule a plurality of access instances for at least one network element based on the determined time period, wherein the scheduled plurality of access instances are scheduled to avoid access collisions. In an embodiment, the application is further configured to access a network element during a scheduled access instance of the plurality of scheduled access instances associated with the network element; and retrieve data from the network element during the scheduled access instance, wherein the data retrieved during the plurality of scheduled access elements such that the data stored on each network element is retrieved before expiration of the predetermined time period.

In an embodiment, a system for resolving network element faults, comprising: a server comprising a non-transitory memory and an application configured to, when executed by a processor: retrieve real-time data for each network element across a plurality of network elements, wherein the data comprises access instances, access requests, and scheduled access events. In an embodiment, each access instance, access request, and scheduled access event is associated with a party, and the application is configured to determine when at least one of: a request for an access to a network element of the plurality of network elements is received while the network element is being accessed; or a request for a access to a network element of the plurality of network elements is received within a predetermined time period of a scheduled access event for the network element. In an embodiment, the application is further configured to determine a party associated with the access request; and send a notification to the party associated with the access request.

In an embodiment, a method of resolving faults across a plurality of telecommunication network elements, comprising: determining, by the application, for each command executed in response to a fault across a plurality of network elements, if the command resolved the fault, wherein at least one command is executed in response to the fault; and determining, by the application, when an executed command resolved the fault; determining, by the application, when an executed command did not resolve the fault. In an embodiment, the method further comprises analyzing, by the application, for a predetermined time period, an effectiveness of the executed command, wherein the effectiveness comprises a number of instances when the executed command resolved the fault divided by a number of instances when the command was executed in response to the fault on the network element. The method further comprises determining, by the application, based on the analysis, a command associated with a highest effectiveness; linking, by the application, the command associated with the highest effectiveness to the fault and the network element; and sending, by the application, an instruction to the network element to execute the linked command in response to a determination that the fault has been received by the network element.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
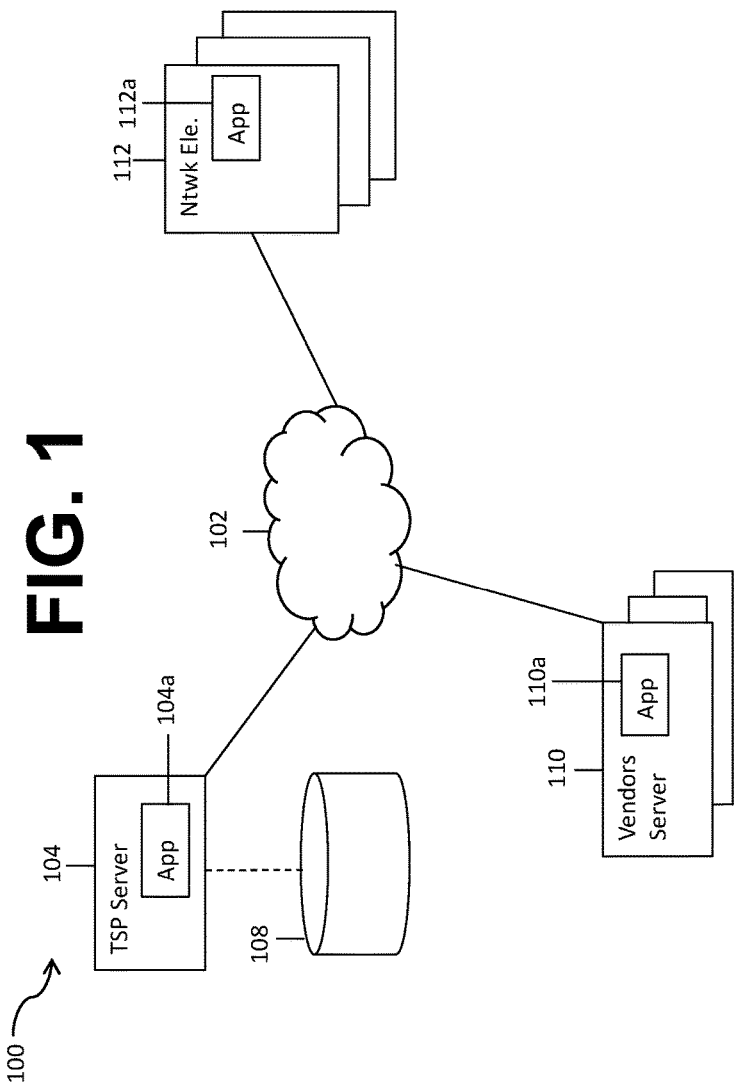
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Telecommunications service providers may collect status data for a plurality of network elements, which are manageable logical entities used to enable the management of one or more physical devices in a unified way using a single management system. These physical devices may include cell sites, routers, amplifiers circuit cards, processors, radios, and so on. In an embodiment, a network operating center may be in communication with a plurality of element management systems (EMS), where each EMS is in communication with one or more cell site, such as an enhanced node B (eNB) or multiple eNBs or a base transceiver station (BTS) and/or with multiple BTS or network elements within a single BTS or multiple BTS. The network operating center may communicate with and/or through the EMS in order to retrieve data associated with the network elements. The network elements discussed herein may comprise power amplifiers, radios, routers, batteries, signal processing cards, antenna, and cell sites.

The network element data may be generated and/or captured at or by the element and stored in a data file local to the network element. This information may be transmitted to or otherwise retrieved by the telecommunications service provider. Different vendors may supply and/or maintain the various network elements, and there may be different intervals for updating and/or generating the files that capture the status and associated values of these network (equipment) items. Depending upon the type of network element, multiple groups within a telecommunications service provider may access the data, that may be stored locally to the provider or remotely by the vendors, and this access may overlap and cause collisions that may slow down the network element being accessed as well as other network processes executing on network elements that may be affected by a slow-down or shut-down of the network element being accessed. The data may comprise records of access to the network elements, these records of access may be in the form of access instances, access requests, and scheduled access events.

Each access instance, access request, and scheduled access event is associated with a party such as the telecommunications service provider or a vendor including an original equipment manufacturer (OEM). The systems and methods discussed herein may be employed to (1) track network element access instances, requests, and faults dynamically and in real-time in order to identify potential collisions and notify the associated parties; (2) analyze data from the network elements to determine when network elements may be accessed by various parties while avoiding collisions; and (3) determine which commands may be automatically executed to resolve faults, thus reducing the accesses to the network elements in response to faults, based upon a fault history of the network element as well as related network elements that includes an effectiveness of the commands executed to resolve a particular fault. The commands discussed herein may be executed on or at a network element by a telecommunications service provider associated with the network element, an original equipment manufacturer (OEM) of the network element, or by other vendors or third parties. These commands may comprise reset, power up, power down, configuration, connectivity checks, or other command types depending upon the network element.

Systems and methods discussed herein are directed to determining when to access (read) data associated with the network elements so as to minimize interference with other processes (e.g., with as little service interruption as possible) while still accessing new and recent (fresh) data. In one example, the telecommunications service provider may analyze the generation of the element data files to determine the schedule for updating the data files. Different network elements may update their data files at different times and/or intervals, this may be associated with different vendors or may be a random and dynamically changing process. An access collision may occur in a plurality of scenarios, including: to access instances during overlapping time periods by different parties or by different actors from the same party; a first party requesting access to the network element while a second party is currently accessing the same element, or parties accessing the network element during overlapping time periods; or the first party requesting access to the network element within a predetermined time period of a scheduled access event.

In another example, access attempts associated with different network elements may be tracked by time, date, duration, and group/department of the telecommunications service provider attempting to access the data to look for collisions between groups and/or process slowdowns. In this example, potential collisions between those accessing the data may be flagged and worked around, and this example may employ a real-time collection of the network element data but may also use a historical analysis of previous access/access attempts to the files by the various groups. The groups/departments discussed herein may be functional, geographic, or otherwise determined by the telecommunications service provider. In an embodiment, network elements and aspects of elements such as CPU utilization, memory utilization, and communication interface throughput on subject network elements including servers may be monitored and analyzed to avoid collisions with independent processing, e.g., to avoid slowing other, unrelated processes of the subject network elements. In this example, the real-time data retrieved from the network elements may be streamed as it is collected, or with a preset millisecond or second(s) delay, to output devices such that both automated and manual monitoring may occur in real-time or in near-real time. This enables improved response to faults, alarms, and other events associated with network elements.

In yet another example, a size of the network element data files may be analyzed in order to determine when the data files are close to the maximum size as determined by the telecommunications service provider or the vendor associated with the network element. Each file may have a predetermined shelf life, e.g., the files may be deleted by the vendor after a predetermined time period from the file reaching its maximum size, and the telecommunications service provider may want to read the files when they are at or near maximum size but prior to deletion.

In various embodiments, a determination of the optimum time for data access and the reduction of collisions and process slowdowns may include an analysis of command history and a comparison with alarms in order to identify the best solutions to provide to engineers or technicians or other employees by storing the solution paths in a solution application that can dynamically learn, in a crowd-sourcing manner across various telecommunications service provider groups/departments, what solutions to apply.

In an embodiment, the system is configured to detect concurrent work on network elements, for example, using a high level tool that is remote from the network element that is issuing commands at the same time a vendor technician is connected with a lower level direct interface to the same element and issuing commands to the same network element. The system may determine the IP addresses associated with entities working on the same network element, send a notification of what each respective accessing entity is doing, and may share information such as a phone number or email or other contact information in order to put the entities in touch to coordinate their work. In other embodiments, the system may use a history of access by each accessing entity and provide recommendations and/or schedule time slots for each entity to access the network element in order to avoid collisions and resultant slowdowns.

As such, the systems and methods discussed herein may, in various embodiments, (1) determine an optimum window or windows of time during which the network element data is automatically accessed and retrieved; (2) perform a real-time analysis of an instant processing state on each subject server computer to avoid collisions with other unrelated processing, (3) collect data associated with multiple command lines to detect duplication of effort and counter intentional collisions/duplication, (4) monitor for resolution of issues reported in the collected data and create a correlation/link from the corrective action to the resolutions (commands) to identify effective maintenance responses and paths in order to provide and in some cases automatically execute selected commands in response to faults on certain network elements.

Using the systems and methods discussed herein, a variety of needs for improvement in data processing and network maintenance are addressed. The need for a variety of entities to collect fresh data from a plurality of network elements without slowing down the network due to collisions and/or faults is addressed. This need is addressed at least by the determination of optimum windows such that the collisions and resulting faults and slowdowns from collisions are reduced. The file size and processing power required to obtain data may also be reduced because duplicate data collections may be detected and prevented by the real-time analysis of activity at the network elements. The need for an improved response time and reduced processing power and costs associated with fault resolution is addressed at least by the creation of a correlation and/or a link between fault types and resolutions. These links enable a more rapid resolution of network faults by selecting the appropriate resolution earlier on in the resolution process.

FIG. 1 illustrates a system 100 configured to execute according to certain embodiments of the present disclosure. The system 100 comprises a plurality of network elements 112 associated with a telecommunications service provider the plurality of network elements 112 are configured to record a plurality of performance and access data that may be stored locally at the network elements 112. In some embodiments, the data may be retrieved via a network 102 by a server 104 of a telecommunications service provider. In some embodiments, the plurality of network elements 112 may be associated with and accessed (e.g., the data retrieved) via an element management system (EMS, not shown) by the server 104. The server 104 may be in communication with a data store 108. The data store 108 may comprise a plurality of information associated with the network elements 112, including scheduled maintenance including downtime, alarms, status of network elements, status of devices, number of call drops, number of blocked calls, and scheduled command execution(s) including those for reset commands. A plurality of vendors, represented as the plurality of vendor servers 110, may have access to some or all of the plurality of network elements 112, depending upon what network elements 112 the vendors manufacture and/or support. Each network element of the network elements 112 may be associated with at least one application 112a, and at least one application 110a may be associated with a server of the vendor servers 110a. These applications 112a and 110a may act to communicate with various applications and servers discussed herein. The plurality of network elements 112 may be accessed for routine maintenance by the telecommunications service provider or by the vendors via the server 104 or the plurality of vendor servers 110. It is appreciated that the servers 104, 110 may communicate with the network elements 112 via the network 102, specifically via applications executing on the servers 104, 110.

The application 104a may be configured to store and analyze historical data retrieved from the plurality of network elements 112. The application 104a may also be configured to evaluate access collisions, potential collisions, and perform fault resolution analysis. Using the methods discussed herein, the system 100 may be configured to determine when to collect data from the network elements 112 in order to obtain recent data without missing data that is captured and stored and then subsequently expires. In alternate embodiments, the system 100 is configured to determine to monitor the plurality of network elements 112 in real-time and, based upon both real-time access, access requests, and a history of access requests, generate notifications to parties in order to avoid access collisions and the associated slowdowns and service interruptions for not only the network element 112 being accessed, but also because of network elements impacted by the network element 112 being accessed. That is, the application 104a may be configured to determine relationships between access and faults among and between network elements. While faults on network elements and access of/to network elements are both discussed herein, it is appreciated that a network element may be accessed for various reasons including but not limited to received faults, anticipated faults based on a fault history on that network element or on related/similar elements, and previously scheduled maintenance, and that access to a network element is not necessarily in response to the receipt of a fault but may also be for routine maintenance, upgrades, or other purposes.

In alternate embodiments, the system 100 may be configured to analyze a history of access instances and collisions among and between various parties in order to determine an optimal time to access the network element(s) 112 for various purposes including maintenance, fault resolution, and data collection. That is, the application 104a may analyze a plurality of historical and real-time data and determine when data collection by the application 104a may be performed without causing collisions with other parties' access or with other access by the telecommunications provider. Similarly, the application 104a may notify parties in real time in response to access requests or ahead of time based on a history of access requests in order for parties to avoid collisions with, for example, scheduled network element maintenance including repair and updates.

Figure 2:
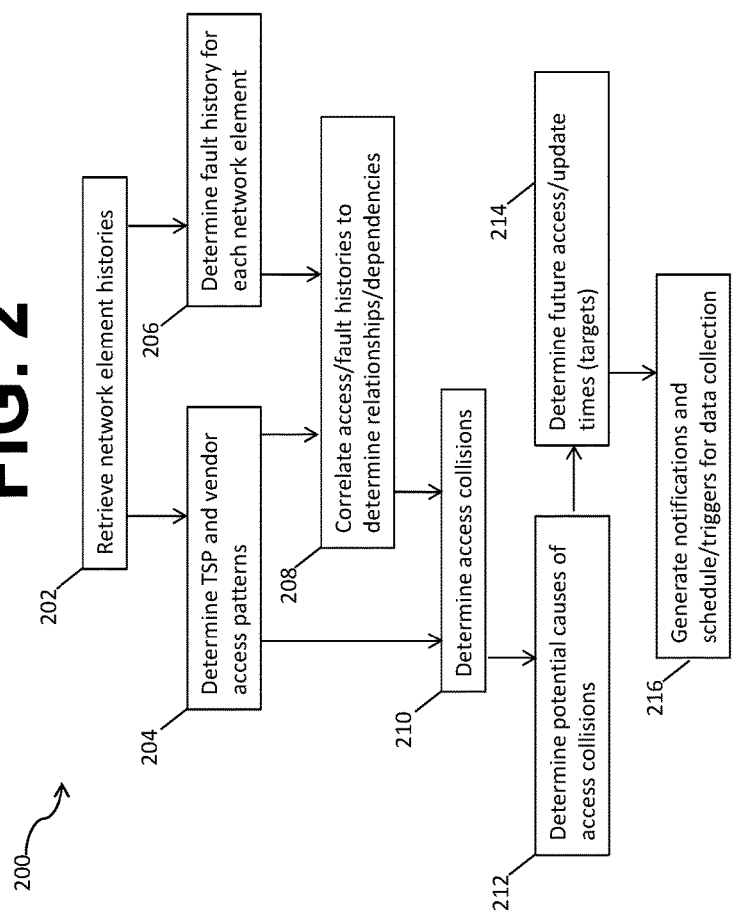
FIG. 2 is a flow chart of a method according to an embodiment of the disclosure.

FIG. 2 illustrates a method 200 according to embodiments of the present disclosure. In the method 200, at block 202, a plurality of network element histories are retrieved. This retrieval may be by an application stored on a telecommunications service provider's server. Each network element of the plurality of network elements stores a plurality of data associated with, for example, access, command execution, scheduled maintenance including downtime, alarms, status of network elements, status of devices, number of call drops, number of blocked calls, and scheduled command execution(s) including those for reset commands, as well as faults. Each network element may store this data for a predetermined period of time, after which the data may be over-written. Telecommunications service providers may endeavor to capture this stored information prior to its over-writing. At block 204, the application may determine access patterns for at least some of the network elements. The access patterns may be determined for both access (remote and on-site) by the telecommunications service provider as well as by vendors and OEMs. In some embodiments, a network element may have pre-scheduled access events, e.g., for maintenance and/or updates. These events may be included in the determination of access patterns.

At block 206, the application may use the retrieved element histories to determine a fault history for each network element. In an embodiment, the fault history comprises a record of faults over a predetermined time period. At block 208, in some embodiments, the application may correlate fault histories to determine relationships and/or dependencies among and between the network elements. That is, the fault history of a first network element for a predetermined time period may be compared to the fault history of other network elements for the same or for an overlapping predetermined time period to determine if there is a relationship between faults received by different network elements and thus potentially a relationship between the network elements. In some embodiments, access histories of multiple network elements may be compared in a similar fashion to determine correlations between network element accesses. At block 210, a plurality of access collisions are determined based on the correlation of access histories and/or faults at block 208. An access collision may be described as a point in time or a time period during which a network element was being accessed by a first party while a second party was attempting to also access the network element, this access may be manual or automatic (e.g., scheduled access) on the part of either or both parties.

At block 212, the application may determine potential causes of detected or future access collisions, based on whether existing network element maintenance schedules are associated access collisions and based on what other network elements were being accessed and/or which had faults occur and/or faults resolved within a predetermined time period of the collisions. These other network elements may be those determined to be related to the subject network element, or may be those that are the same type of network element. At block 214, the application may determine (1) a plurality of predicted future collisions based upon the access histories and/or maintenance schedules; and (2) a plurality of future access times/target access windows for both the telecommunications service provider and vendors such that collisions between parties are avoided. Subsequently, at block 216, a plurality of notifications may be generated and sent to the telecommunications service provider and vendors. Each notification may provide an indication of when a party may access a network element in order to avoid collisions with other parties.

Figure 3:
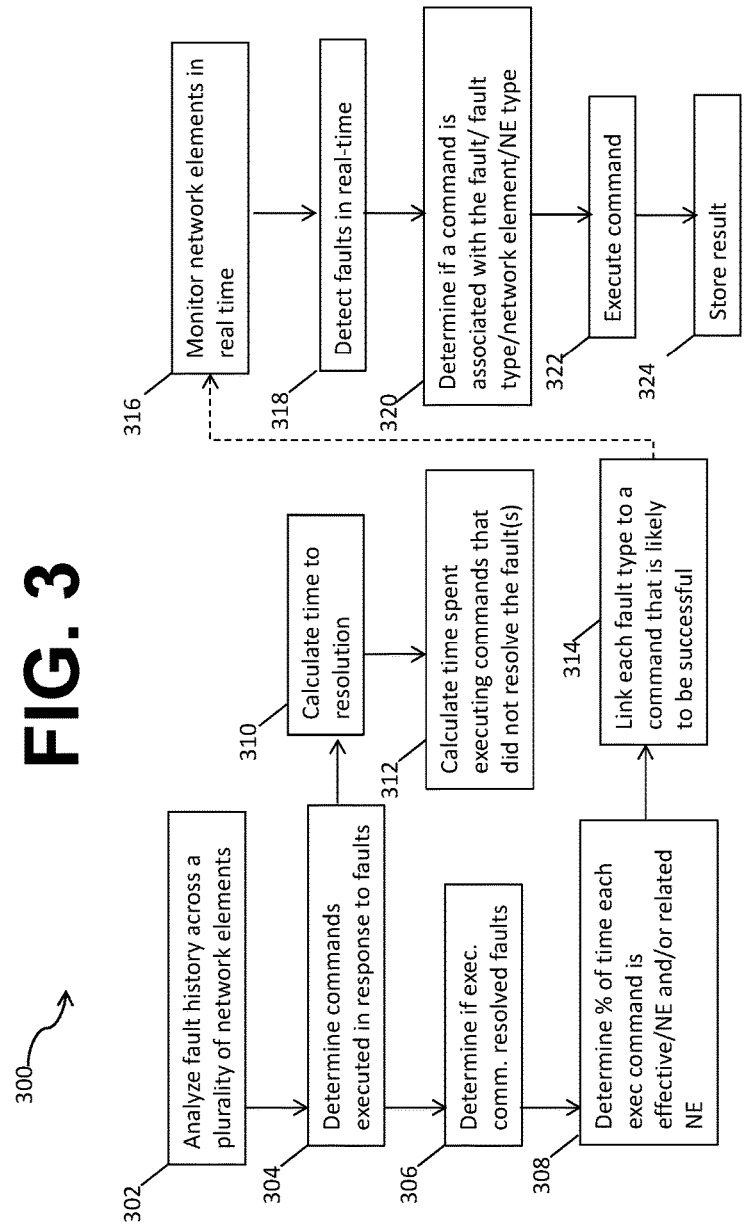
FIG. 3 is a flow chart of another method according to an alternate embodiment of the disclosure.

FIG. 3 illustrates a method 300 of analyzing fault resolutions and automatically selecting and executing a command in response to a fault on a network element. In the method 300, historical data is used to determine the most cost effective and efficient commands (fault resolutions) for a network element or a group of network elements such that a command is identified as a preferred or most effective resolution and can then be associated with a network element or elements and automatically executed to resolve a fault, thus saving time and money and preserving the customer experience.

At block 302 of the method 300, an application stored on a server such as the application 104a in FIG. 1 analyzes fault history across a plurality of network elements. This fault history may be taken from the information stored at block 202 in FIG. 2. The analysis of the fault history may comprise, at block 304, determining commands executed in response to faults across the plurality of network elements. This determination at block 304 may analyze faults received by the plurality of network elements over a predetermined time period. As discussed above, network elements may be analyzed in isolation or it may be determined which network elements impact the function of other network elements, and that information may be used to apply commands (fault resolutions) to more than one network element. At block 306, the application determines which commands executed in response to faults resolved the faults, and at block 308 the percentage of time that each executed command was effective for a particular network element is calculated. This may be referred to as the resolution effectiveness for a command. In some embodiments, the effectiveness for a command may be determined for various combinations of faults, fault types, network elements, and network element types, such that the resolution effectiveness of the commands may be ranked from most effective to least effective. This information may be dynamically updated.

At block 310, a time from the fault's occurrence until the fault's resolution may be determined, and this may be correlated to the command(s) attempted. For example, if for a network element 88 of the plurality of network elements 112 in FIG. 1, 3 commands are executed in response to a fault, and it takes 15 seconds until the third fault is executed and successfully resolves the fault, the time to resolution would be 15 seconds. The resolution of faults may be referred to as a fault clearance or fault resolution history. The fault clearance history for each network element may comprise the occurrences of faults, number of commands executed to clear each fault occurrence, whether each command was successful, other times that the command was successful for a network element and/or related network elements (using the relationships/dependencies previously determined), and a time from fault occurrence to resolution (time to clearance).

At block 312, the time spent executing commands that did not resolve the fault is determined. That is, the time taken by executing commands that did not resolve the fault, time which could have been saved if a command was associated with a fault type and/or network element and/or network element type, is calculated. This may also be referred to as "down time." Using the previous example, the time spent executing the two commands that did not result in resolution would comprise the time from the fault's occurrence until the command that resolves the fault is executed, e.g., the time spent on commands that didn't resolve the fault would be less than 15 seconds. In some embodiments, at block 312, the application may also determine a number of commands attempted prior to the command that successfully resolves the fault. At block 308, commands that successfully resolved faults may be analyzed to determine the percent of time that a command successfully resolves a fault as compared to the number of times it is executed on a particular network element, type of network element, or group of network elements.

In an embodiment, at block 314, based at least in part on the determination at block 312 and the effectiveness determination at block 308, for at least some of the network elements, faults may be associated with at least one command that has been determined to be an effective solution to resolve the fault based upon historical data associated with that network element or a related (family) network element. In an embodiment, the command associated with the highest resolution effectiveness of a plurality of commands executed in response to a fault, fault type, network element, or network element type may be the command selected for association at block 314. The method 300 may be repeated from blocks 302 through 314 on a periodic basis to ensure that the most effective resolutions are being linked to each network element, network element type, and/or fault type.

At block 316, the network elements may be monitored in real time by an application such as the application 104a from FIG. 1. Faults may be detected in real time at block 318, such that at block 320, the application determines if there is a command associated with the fault (or a fault type) and the network element or element type based on the fault received by the network element. At block 322, if the application determined at block 320 that there is a command linked to the received fault or fault type and the network element or network element type, the application sends an instruction to the network element (1) to execute the command and (2) to indicate which command to execute. At block 324, the network element's response (e.g., was the fault cleared using the command?) is stored by the network element in the data file and may later be retrieved by the application.

Thus, continuing the example, a network element X may have command Y associated with (linked to) a fault Z, such that the command Y is automatically executed in response to the fault Z occurring. Thus, the time to resolution is improved because the commands may not be executed manually in a trial-and-error fashion, or automatically in a fashion that would also take more time. This is an improvement to fault resolution because of the improved (decreased) network element down time and improved time to fault resolution for the network element involved, as well as for related and associated elements that may experience service interruptions or slowdowns when other network elements experience faults. In some embodiments, the application may determine the success of fault-resolving commands in light of the party executing the command. For example, if the command came from the telecommunications service provider, or a vendor/OEM, which may be considered a form of crowd-sourcing.

Figure 4:
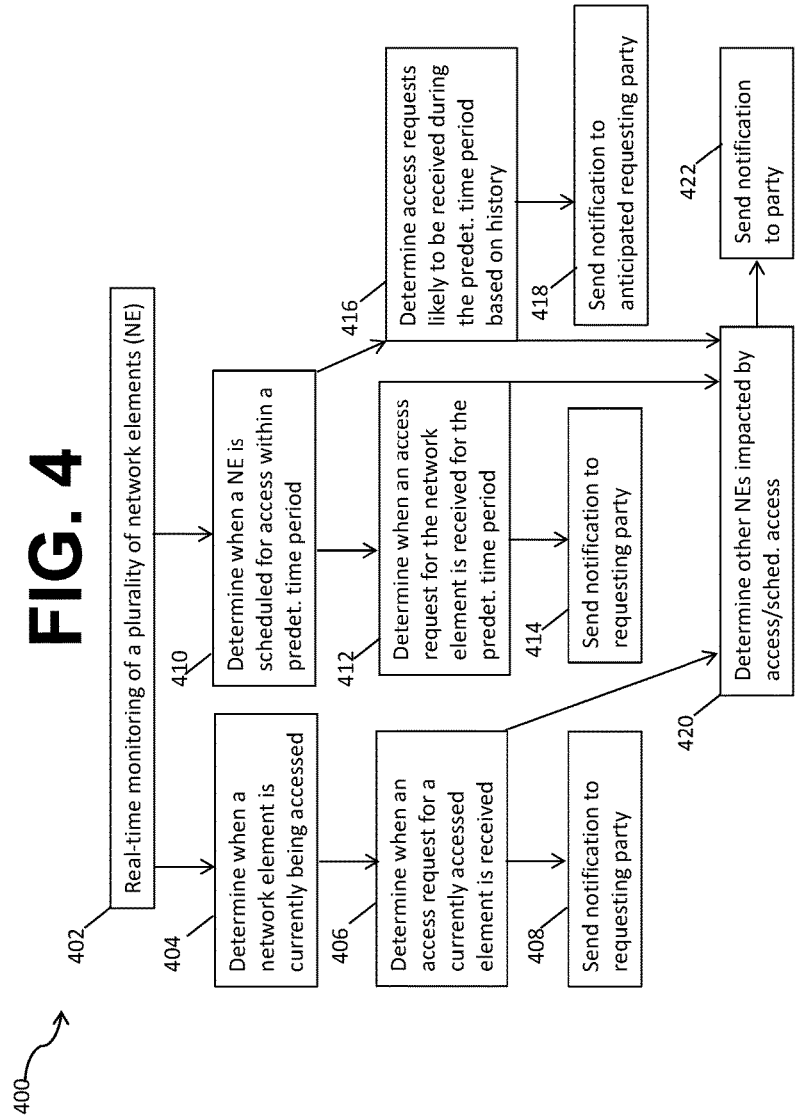
FIG. 4 is a flow chart of another method according to an alternate embodiment of the disclosure.

FIG. 4 illustrates a method 400 of scheduling network access to avoid collisions. In the method 400, at block 402, real-time monitoring of a plurality of network elements occurs. This real-time monitoring at block 402 may comprise the network elements pushing data to an application on a remote server, or may comprise an application on the remote server retrieving the data in real-time, which may also be referred to as dynamic retrieval or "monitoring." This monitoring may be performed by a collision analysis application. The data is retrieved at block 402 from the plurality of network elements such that data recorded by the network element does not expire before it is retrieved. This real-time monitoring at block 402 enables multiple ways to avoid collisions between network element accesses. At block 404, the collision analysis application determines when a network element is currently being accessed, and at block 406 the collision analysis application determines when access requests for that network element are received so that, at block 408, a notification may be sent by the collision analysis application to at least the requesting party. This notification sent at block 408 may indicate that the network element is being accessed, and it may also contain an indication as to when the network element will be available to the requesting party.

In another embodiment, at block 410, the collision analysis application may determine when a network element is scheduled for access within a predetermined time period, for example, the application may determine when a network element is scheduled for access within 15 seconds, 30 seconds, 1 minute, 5 minutes, 10 minutes, or within hours of the monitoring. At block 412, the collision analysis application may determine when an access request for the network element is received for the predetermined time period, and at block 414 a notification may be sent to the requesting party, similarly to the notification sent at block 408.

In another embodiment, at block 416, the collision analysis application may determine, based upon a history of access requests previously received by the network element, which party or parties are likely to make an access request during the time period when the network element is scheduled for access, as determined at block 410. At block 418, the collision analysis application may send a notification or notifications to the party or parties whose requests for access are anticipated during the time period when the network element is scheduled for access.

In any or all of the embodiments discussed in the method 400, subsequent to blocks 406, 412, and/or 416, at block 420, the collision analysis application may determine other network elements that may be impacted by requested, scheduled, or historically requested access to the network element. In this example, the party or parties who are scheduled to access the other network elements, or who have historically accessed other network elements during a similar time frame, may receive a notification at block 422 that the other network elements may be preferably accessed during other time periods. The notification sent at block 422 by the collision analysis application may indicate the network element that is being accessed/is scheduled for access, identify the related network element or elements, and contain an indication as to when the related network element or elements will be available to the party that has requested or has historically requested access.

Figure 5:
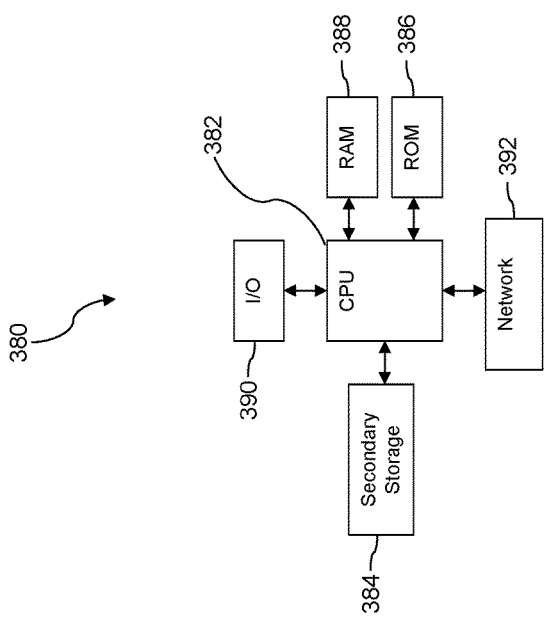
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for determining when to retrieve data across a plurality of network elements, comprising:
    a server comprising a non-transitory memory and an application configured to, when executed by a processor:
        retrieve data for a plurality of network elements across a telecommunications network, wherein the data comprises instances of the plurality of network elements being accessed, access requests to access the plurality of network elements, scheduled maintenance, faults, and fault resolutions, wherein the instances of the plurality of network elements being accessed and the access requests are each associated with a party, and wherein the data stored on each network element expires after a predetermined time period;
        correlate, for each network element of the plurality of network elements, the instances of the plurality of network elements being accessed and the access requests to determine a plurality of access collisions;
        determine, for each network element, a time period for a corresponding network element to be accessed based upon the plurality of access collisions;
        schedule a plurality of future access instances for one or more network elements based on the determined time period, wherein the scheduled plurality of future access instances are scheduled to avoid access collisions;
        access a network element, during one of the scheduled plurality of future access instances associated with the network element; and
        retrieve data from the network element during the one of the scheduled plurality of future access instances, wherein the data retrieved during the one of the scheduled plurality of future access instances is retrieved before expiration of the predetermined time period.

2. The system of claim 1, where the plurality of network elements comprise power amplifiers, radios, routers, batteries, signal processing cards, antenna, and cell sites.

3. The system of claim 1, wherein each fault resolution is associated with a fault on a network element of the plurality of network elements and comprises at least one command executed in response to the fault and an indication as to whether the at least one command succeeded.

4. The system of claim 3, wherein each fault resolution further comprises a time from an occurrence of the fault to a resolution of the fault.

5. The system of claim 1, wherein the party associated with the instances of the plurality of network elements being accessed or the access requests is the telecommunications service provider, a vendor, or an original equipment manufacturer (OEM).

6. The system of claim 5, wherein the plurality of access collisions is each associated with at least one of:
two different parties accessing the network element during overlapping time periods;
a first party requesting access to the network element while a second party is currently accessing the same network element; or
the first party requesting access to the network element within a predetermined time period of a scheduled access event.

7. The system of claim 1, wherein the application sends a notification to at least one party that comprises an indication of at least one of the network element currently being accessed, a time period during which the network element will be accessed, and a time period during which the party can access the network element without colliding with another party.

8. The system of claim 1, wherein the application further:
determines when at least one of:
an access request for access to one of the plurality of network elements is received while the one of the plurality of network elements is being accessed; or
an access request for access to the one of the plurality of network elements is received within a predetermined time period of a scheduled access event for the one of the plurality of network elements;
determines a party associated with the access request; and
sends a notification to the party associated with the access request.

9. The system of claim 8, wherein the application further:
determines at least one other network element impacted by the at least one of the plurality of network elements associated with the access request; and
determines whether the at least one other network element is currently being accessed or is scheduled for an access event within the predetermined time period.

10. The system of claim 9, wherein the application is further configured to:
determine at least one of a party associated with the current access of the at least one other network element or a party associated with the scheduled access event; and
send a notification to the at least one of the party associated with the current access of the other network element or the party with the scheduled access event.

11. The system of claim 8, wherein the notification comprises an indication of at least one of the one of the plurality of network elements currently being accessed, a time period during which the on one of the plurality of network elements will be accessed, or a time period during which the party can access the one of the plurality of network elements without colliding with another party.

12. The system of claim 8, wherein the application is further configured to retrieve real-time data from a plurality of element management systems, and wherein each element management system is associated with at least some network elements of the plurality of network elements.

13. The system of claim 1, wherein the plurality of network elements are located remotely from the server.

14. The system of claim 1, wherein the application further:
in response to a fault on at least one of the plurality of network elements, determines for each command executed if the command resolved the fault, wherein at least one command is executed in response to the fault;
determines when an executed command resolved the fault;
determines when an executed command did not resolve the fault;
determines, for a predetermined time period, an effectiveness of each executed command, wherein the effectiveness comprises a number of instances when the executed command resolved the fault divided by a number of instances when the command was executed in response to the fault on the at least one of the plurality of network elements;
determines based on the analysis, a command associated with a highest effectiveness;
links the command associated with the highest effectiveness to the fault and the at least one of the plurality of network elements; and
sends an instruction to the at least one of the plurality of network elements to execute the linked command in response to a determination that the fault has been received by the at least one of the plurality of network elements.

15. The system of claim 14, wherein the application further:
determines a number of commands executed to resolve the fault;
determines an amount of down time during which the number of commands were executed prior to resolving the fault.

16. The system of claim 15, wherein the application further ranks each executed command based on the determination of the amount of down time of the plurality of network elements.

17. The system of claim 14, wherein the effectiveness further comprises a number of instances when the executed command resolved a fault type similar to the fault divided by a number of instances when the command was executed in response to a fault type similar to the fault on the at least one of the plurality of network elements.

18. The system of claim 14, wherein the effectiveness further comprises a number of instances when the executed command resolved the fault divided by a number of instances when the command was executed in response to a fault type similar to the fault on a network element of a similar type as the at least one of the plurality of network elements.

* * * * *